Jan. 7, 1969   R. L. CASSEL   3,421,071
RECTIFIER FOR ACCELERATOR MAGNETS
Filed March 28, 1966   Sheet 1 of 2

INVENTOR.
BY   RICHARD L. CASSELL

3,421,071
RECTIFIER FOR ACCELERATOR MAGNETS
Richard L. Cassel, Port Jefferson, N.Y., assignor to the United States of America as represented by the United States Atomic Energy Commission
Filed Mar. 28, 1966, Ser. No. 538,918
U.S. Cl. 321—26      3 Claims
Int. Cl. H02m 7/00

ABSTRACT OF THE DISCLOSURE

Power supply for high energy, alternating gradient, accelerator magnets wherein alternating current from a motor generator is rectified and supplied to the magnets for providing respective increasing and constant voltages during first and second intervals with low ripple and low power requirements. The motor generator has four three element Y windings, and these windings each have input and output leads each with first and second parallel connected rectifiers, including rectifiers connected to the center of the Y's, that are sequentially alternately triggered to share the current of the Y's for simulating twenty-four phase rectification to produce low ripple.

---

This invention relates to flat-top systems for accelerator magnets and more particularly to an improved rectifier configuration for providing a flat-top system for accelerators having confining and focusing magnets that are energized at frequent intervals with substantially constant direct current. This invention was made in the course of, or under a contract with the United States Energy Commission.

In the field of charged particle accelerators, it is necessary to provide direct current for the confining and focusing magnets whereby at frequent intervals this current increases during a first interval and then is maintained substantially constant or flat-topped during a second interval. Various proposals have been made and used for supplying this current, including the systems employing fly-wheel equipped motor generators providing alternating current that is rectified by conventional grid controlled ignitrons that are cut-off by back-bias, also referred to as reverse bias, and are phase shift controlled, hereinafter referred to by the term phased back so as to decrease the voltage supply during the flat-top interval. The power dissipation in the generator during this flat-top process, however, has been high because the current distribution has not changed and this has resulted in generator overheating and/or burnouts. It is also advantageous to provide a practical and efficient system for producing extended flat-top intervals safely and effectively for long operating lifetime services so as to increase the effectiveness and efficiency of the accelerator or providing long periods of particle storage during flat-top intervals at high or full particle energies.

This invention provides method and apparatus for the flat-topping of power supplies for high energy accelerators operating in the multiple bev. range, such as the Alternating Gradient Synchrotron at the Brookhaven National Laboratory. The method and apparatus involved in this invention utilize standard and well known techniques and apparatus and are highly flexible for a wide range of accelerators, particles, particle energies, flat-top interval lengths, and flat-top repetition rates. More particularly this invention provides an improved rectifier configuration that reduces ripples and power dissipation in the generator during the phase back flat-top process of the pulsing cycle of the accelerator magnets. With the proper selection of components and arrangement thereof, as described in more detail hereinafter, the desired flat tops are achieved.

It is an object of this invention to provide a method and apparatus for the flat-topping of power supplies by providing an arrangement of eight rectifiers in a Y configuration with two rectifiers across the vertex of the Y.

It is a further object of this invention to reduce ripple and power dissipation in power supplies for accelerator magnets during flat-topping;

It is a still further object of this invention to provide a practical and efficient system for producing extended flat-top intervals for accelerator magnets safely and effectively for long operating lifetimes.

The above and further objects and novel features of this invention will appear more fully from the following detailed description when the same is read in connection with the accompanying drawings. It is to be expressly understood, however, that the drawings are not intended as a definition of the invention but are for the purpose of illustration only.

In the drawings where like elements are referenced alike:

Figure 5:
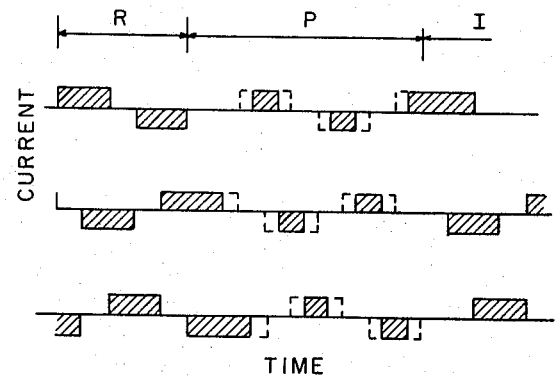

FIG. 5 is a schematic illustration of the current distribution in the Y legs of the system of this invention at $\phi 1$, $\phi 2$, and $\phi 3$ where the cross-hatched boxes indicate current in Y phase if alternating half-wave is used and uncross-hatched boxes indicate current if not half-wave phase back is used.

Figure 1:
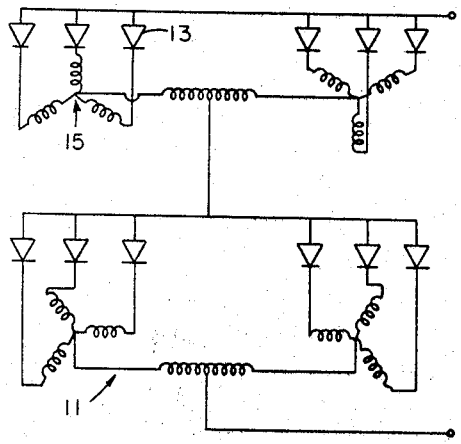
FIG. 1 is a schematic drawing of a six-phase rectifier system.

Referring to FIG. 1, an overall generator-rectifier configuration 11 is shown wherein there are two six-phase rectifiers 13 connected in series. The six phase is produced by two three-phase Y connected rectifiers 13 with an interphase. The resulting Y leg 15 has a 120° commutation angle. By phasing one of the six-phase rectifiers 13 by 30° a true 12-phase rectification is obtained.

Figure 2:
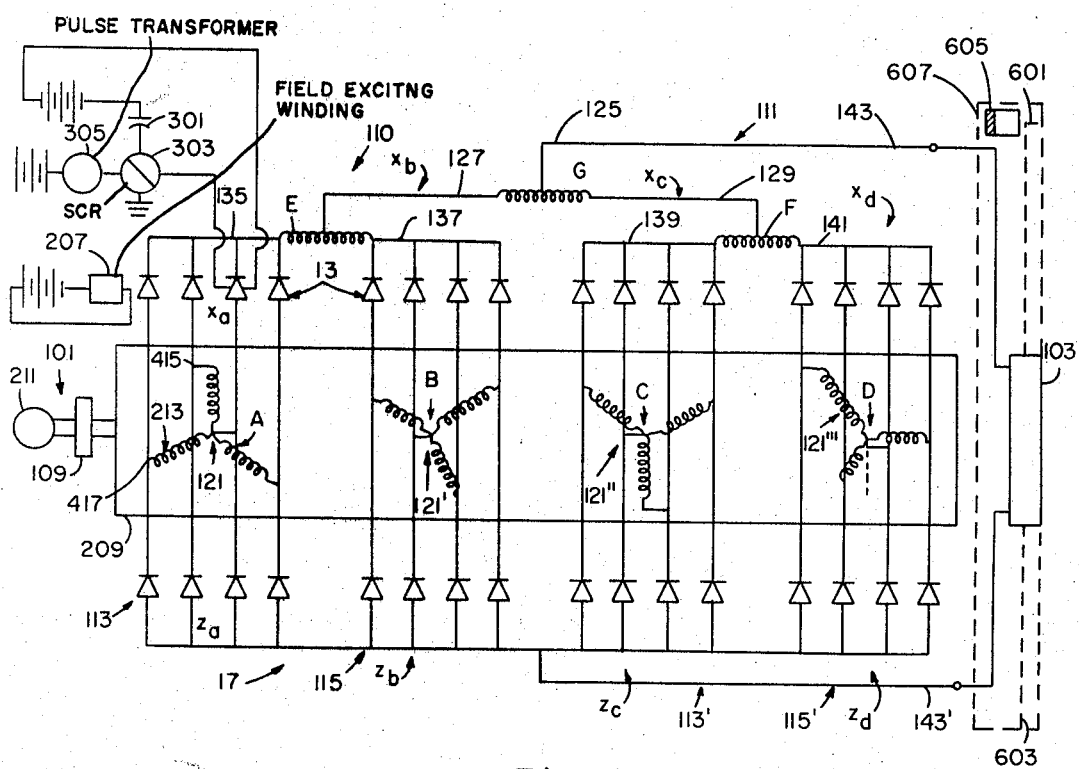
FIG. 2 is a schematic illustration of the full-wave, 12-phase rectifier system with half-wave phase back in accordance with this invention.

In accordance with this invention the rectifier configuration 17 shown in FIG. 2 embodies the same peak output voltage and current from the same generator described in FIG. 1, with provision for a 12-phase half-wave condition during phasing back to meet the additional requirements of the flat-top. Under full rectify the Y's A, B and the Y's C and D commutate as a full wave 12-phase rectifier because of interphase transformers E and F. The balancing transformer G is used to split the total current between the two 12-phase rectifiers. Rectifiers $X_a$ through $X_d$ and $Z_a$ through $Z_d$ are all back biased. During the phase back condition rectifiers $X_a$ through $X_d$ and $Z_a$ through $Z_d$ conduct, converting the full-wave configuration into a half-wave configuration. By continuing to fire all of the rectifiers as if they were still in the full-wave configuration, the current alternates between rectifiers $X_1$ and $Z_1$ to produce an effective six-phase rectification, which when interphased produces the desired 12-phase output illustrated in FIGS. 3a through 4.

The result is that the ripple is reduced to at least 43% of the series six-phase ripple, during phase back, for an equivalent DC voltage up to 25% of the peak DC voltage. For DC voltages higher than 25% of peak, the half-wave configuration converts to the full wave and back to the half wave, resulting in slight change in ripple and still continuous DC control.

Because of the half-wave effect, the power dissipation is reduced during phase back or flat-top, since the current distribution changes as shown in FIGURE 5.

Relating all current related losses per Y leg to have an effective resistance $R_1$ the power dissipation per cycle is approximately as follows:

(For full rectify)

$$\text{Power per } Y \cong (3)(RI_y^2)(\tfrac{2}{3}) = 2RI_y^2$$

$$I \text{ total} = 4I_y$$

$$\therefore \text{ Power total} \cong (4)(\tfrac{1}{8}RI_y^2)$$

(For phase back condition)

(DC voltage <25% peak)
$$\text{Power per } Y \cong 3(RI_t^2)(\tfrac{1}{3})$$
$$\text{Power total} \cong 4(\tfrac{1}{16}RI_t^2)$$

(For six-phase configuration)

$$\text{Power per } Y \cong 3(RI_y^2)(\tfrac{1}{3})$$
$$I_y = \tfrac{1}{2}I_t$$
$$\text{Power total} \cong 4(\tfrac{1}{4}RI_t^2)$$

It is clear from the above that the power dissipated per cycle during phase back is ~½ of the dissipation during full rectify, i.e. the power dissipation during phase-back or flat-top is about ½ of the dissipation without the half-wave rectifiers and approximately ¼ of the dissipation of the systems known heretofore for the same output. Also, the ripple during phase back for DC voltage values of less than 25% of peak are 43% of the ripple known heretofore.

In a practical system for accomplishing the desired flat-top in accordance with this invention, there are provided suitable timing circuits and a balancing transformer G having a high-frequency interphase. This provides a true 24-phase ripple during phase back, reducing the ripple current by an additional factor of four. This results in the substantial reduction or elimination of the need for a ripple filter.

A flywheel equipped motor-generator 101 energizes accelerator particle orbit magnets 103 through the full-wave 12 phase (with half-wave phase back) rectifier system 17 of this invention. In this system eight rectifiers 13 are arranged in a Y configuration with two rectifiers across the vertex of the Y's A, B, C and D. Source 101 produces alternating current and the rectifier system 17 changes this AC to direct current. This direct current is maintained substantially constant during flat-top by controlled rectifier phase back, followed by additional phase back at the termination of the flat-top period to remove stored energy from the magnets and to store energy in the flywheel 109 of motor generator 101.

To this end a first rectifier bank 110 and a second rectifier bank 111 are used having two subunits each, i.e. subunits 113 and 115 and 113' and 115'. Each of these subunits, comprises eight back-biased rectifiers 13 coupled with six of said rectifiers in three-phase Y configurations A, B, C and D to give 120° commutation and coupled with two of said rectifiers in series with the vertex 121 (121', 121", or 121''') of the respective Y configurations. One of the rectifiers 13 is on each side of the vertex and the phases of each of the three phase Y configuration in each subunit is uniformly 30° apart. Additionally, the phases of the three-phase Y configuration in each subunit of the second rectifier bank 111 is uniformly 180° from the corresponding phases of the three-phase Y configuration in each subunit of the first rectifier bank 110.

Coupled to the motor generator 101 is a balancing transformer G for splitting the total current between the first and second rectifier banks 110 and 111. This transformer G also has a center-tapped input 125 from generator 101 and symmetrical outputs 127 and 129. Coupled respectively to these outputs are interphase transformers E and F for splitting the current between each subunit of the rectifier banks. These transformers E and F have center-tapped inputs 127 and 129 respectively and symmetrical outputs 135, 137, 139 and 141 respectively. Outputs 143 and 143' from rectifier banks 110 and 111 supply magnets 103.

In operation a field exciter 207 is used for generator 209 while motor 211 rotates the 12 windings 213 in generator 209 through flywheel 109 to energize magnets 103. The rectifiers $Z_a$, $X_a$, $Z_b$, $X_b$, $Z_c$, $X_c$, $Z_d$ and $X_d$, as well as the other rectifiers 13 are grid controlled ignitrons whose grids are fired by discharging capacitors 301. To this end silicon controlled rectifiers 303 are fired by pulse transformer 305 sequentially to fire the SCR's 303 to discharge the capacitors 301 to fire the grids of each of the ignitrons to make their respective Y conductors 213 conductive in the proper sequence. Only one connection to one ignitron 13 is shown for ease of explanation, in actuality each rectifier 13 having like connections to separate capacitors 301. This system whose triggers operate at 10 microseconds, is ten times faster than using a pulse transformer to fire thyratrons to trigger the rectifier 13 of this invention. Also, this system has low ripple and is capable of operating at high voltages from 6,000 to 12,000 volts and 6,000 amps for driving the inductive load of magnets 103.

Figure 3B:
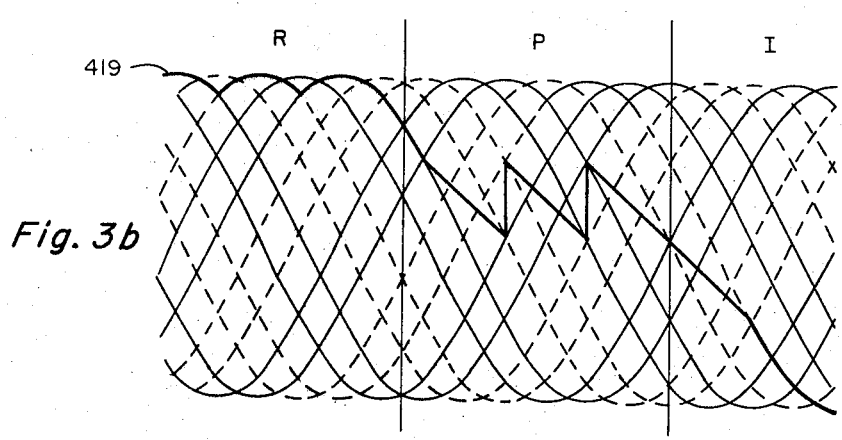
FIG. 3b is a graphic illustration of the voltage waveform of rectify, full-wave, and phase back across two windings of the generator of FIG. 2.
Figure 3A:
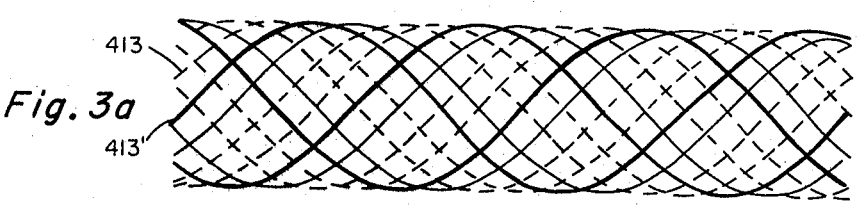
FIG. 3a is a graphic illustration of the voltage waveform of one of the phases of the output of the generator of FIG. 2 across each generator winding.

Each line 413 in FIG. 3a, represents the voltage of one of the phases of the output of generator 209 in one bank e.g. bank 110, across one generator winding 213, e.g. from terminal 417 to terminal 121. There are twelve lines 413 in FIG. 3a since each line represents the voltage across one of the 12 windings 213 in generator 209 in accordance with this invention. The line 419 in FIG. 3b represents the voltage across two generator windings 213, e.g. from terminal 417 to terminal 415. The lines in FIG. 3b are the composite voltages of FIG. 3a.

Figure 4:
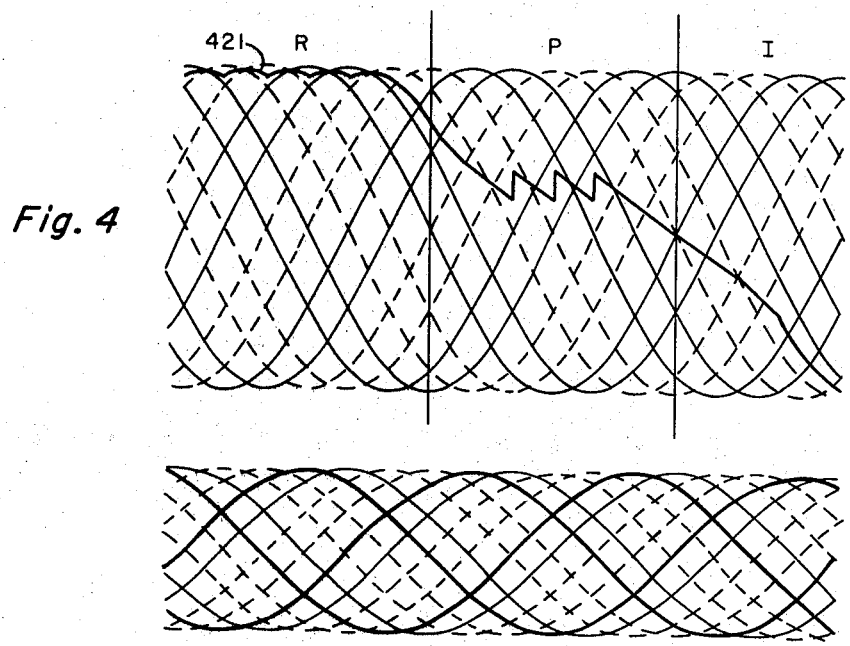
FIG. 4 is a graphic illustration of the voltage waveform out of the power supply of this invention.

The voltage out of the power supply 101 across leads 143 and 143' from both banks 110 and 111 of this invention are represented by curve 421 in FIG. 4. As shown, this output is pulsed in a cycle wherein it is very high and has a very low ripple during the rectify interval R, lowers during the phase back interval P, which lasts about 400 milliseconds, lowers still further by additional phase back to remove stored energy from the magnets and to store this energy in the flywheel 109 during the invert interval I, and then increases again to the level shown in FIG. 4 in the rectify interval for the repetition of another like pulsing cycle in which particles acceleration in confining magnets 103 from a low energy to a high energy. This voltage curve 421 represents the operation of this invention with all the rectifiers 13 therein.

In the rectify condition, the voltages are summed up from two windings at a time to get a high voltage across leads 143 and 143'. During phase back, the voltages are not summed up from the two windings and only one winding feeds outputs 143 and 143' at a time.

It is noted that if no rectifiers 13 are used and the windings 213 of generator 209 provide a full wave Y, then the voltage out of the power supply 101 is like curve 421 but $\sqrt{3}$ times larger in ripple voltage. Thus the power dissipation in the generator 101 is also higher.

FIGURE 5 schematically illustrates the current flow in leads 143 and 143' in accordance with this invention. The dotted lines show the current without diodes $X_a$, $X_b$, $X_c$ and $X_d$ and $Z_a$, $Z_b$, $Z_c$ and $Z_d$. The cross-hatched areas illustrate the current with these diodes and the other diodes 13. It will be seen from this drawing that in accordance with this invention there is always current through two windings (one in and one out) during the rectify interval. During the phase back interval, there is an initial summing current, but this rapidly changes to a condition of no summing current so that there is current through only one winding of each (one) total Y at a time. The invert interval duplicates the above-described rectify summing condition, differing, however in that the operation is in the lower half of the sine wave 413' in FIG. 3a.

The heavy shaded sine wave lines 413' represents the voltage in one of the Y's, e.g. Y A throughout the R, P and I intervals. The sine light shaded wave lines 413 represent the voltage in the other Y's, i.e. B, C and D.

This invention has the advantage that it reduces ripple during phase back of a very high voltage and very high current m-g system and also reduces power dissipation in the generator windings because of $I^2R$ losses. The operability of this invention in reducing ripple has been shown in actual tests. This low ripple has the significant advantage of increasing the efficiency of target 601 for beam 603 in septum magnet 605 for extractions since the bevatron oscillation in the accelerator 607, e.g. the BNL AGS is reduced from a present 50 mils movement from the septum edge to a 25 mils movement with this invention. Thus the beam can be brought closer to the edge of the septum magnet without losing particles from impaction with the septum before the beam is bumped into the inside of the septum magnet. This reduced beam bevatron oscillation distance from the desired beam circular axis also increases the efficiency of slow extraction e.g. using ¾ integral resonance since the beam crosses back and forth across the ¾ integral resonance almost not at all with this invention, thus substantially not changing the extraction rates. This invention also has the advantage of providing a practical and efficient system for providing extended flat-top intervals safety and without generator winding burnout for long periods of time and thereby increases the effectiveness and efficiency of high energy particle accelerators.

What is claimed is:

1. In the combination of a motor-generator means (101) having exciter means (207) and twelve alternator windings (213) forming four three element Y's (A, B, C and D) whose respective windings (213) extend from first ends to opposite ends connected at vertices (121, 121', 121'' and 121''') to form said four Y's for supplying alternating current, controlled rectifier means (13) for rectifying said alternating current and providing direct current from said windings (213) during first intervals (R) of increasing current and second intervals (P) of substantially constant current, and accelerator magnet load means (103) having input and output ends for receiving said direct current from said rectifier means (13) and returning it in a circuit to said windings (213), an improved rectifier configuration (17) comprising:

(a) sixteen first controlled rectifiers (13) having inputs and outputs forming four first groups ($x_a$, $x_b$, $x_c$ and $x_d$) each having four controlled rectifiers (13) respectively connected at their inputs to said three first ends of said windings (213) and the vertex formed by their opposite connected ends in one of said four Y's (A, B, C and D) and respectively connected at their outputs to said input end of said magnet load means (103);

(b) sixteen second controlled rectifiers (13) having inputs and outputs forming four second groups ($z_a$, $z_b$, $z_c$ and $z_d$) each having four controlled rectifiers (13) respectively connected at their outputs to said three first ends of said windings (213) and the vertex formed by their opposite connected ends in one of said four Y's (A, B, C and D) and respectively connected at their inputs to said output ends of said magnet load means (103), the outputs of said second controlled rectifiers being respectively connected in parallel with the inputs of one of said first controlled rectifiers; and (c) means including a capacitor (301) having a silicon controlled rectifier (303) fired by a pulse transformer (305) for discharging the capacitor (301) to fire the respective parallel connected first and second controlled rectifiers (13) sequentially alternately to share the current of the windings (213) of said Y's (A, B, C and D) to make the respective windings (213) conduct to said magnet load means (103) through alternate of said first and second controlled rectifiers to produce an effective six phase rectification in each of said Y's (A, B, C and D) during said second interval (P).

2. The invention of claim 1 having two first center tapped balancing transformers (E and F) respectively forming opposite end taps between two of said first groups ($x_a$ and $x_b$, and $x_c$ and $x_d$) of said first controlled rectifiers (13), and a second center tapped balancing transformer (G) forming opposite end taps between the center taps of said two first balancing transformers (E and F) and having its center tap connected to the input end of said magnet load means (103) for providing 24-phase ripple for said magnet load means (103) during said second interval (P).

3. The invention of cliam 1 in which said means for firing said controlled rectifiers (13) causes them alternately to conduct to produce increasing voltages from said windings (213) for the magnet load means (103) during said first interval (R), and to produce a substantially low ripple constant voltage from said windings (213) for the magnet load means (103) during said second interval (P).

References Cited
UNITED STATES PATENTS 3,308,368   3/1967   Schmidt _____ 321—26 X
3,340,413   9/1967   Drabik.

JOHN F. COUCH, *Primary Examiner.*

G. GOLDBERG, *Assistant Examiner.*

U.S. Cl. X.R.

310—68; 321—27, 28; 322—9